United States Patent [19]
Drahoslav et al.

[11] 3,761,529
[45] Sept. 25, 1973

[54] METHOD OF PURIFYING ALKALI METAL ALKOXIDES

[75] Inventors: Lím Drahoslav; Jiří Čoupek; Lubomír Lochmann, all of Praha, Czechoslovakia

[73] Assignee: Ceskoslovenska Akademie Ved, Praha, Czechoslovakia

[22] Filed: July 15, 1970

[21] Appl. No.: 55,242

[30] Foreign Application Priority Data
July 28, 1969 Czechoslovakia .................. 5241/69

[52] U.S. Cl..... 260/643 A, 260/89.5 A, 260/631 H, 260/632 A
[51] Int. Cl...... C07c 29/24, C07c 31/30, C08f 3/66
[58] Field of Search..................... 260/632 A, 643 A

[56] References Cited
UNITED STATES PATENTS
2,662,100   12/1953   Hill ............................... 260/632 A
3,418,383   12/1968   Lenz et al. ...................... 260/643 A

FOREIGN PATENTS OR APPLICATIONS
625,453   6/1949   Great Britain .................. 260/632 A
746,400   3/1956   Great Britain .................. 260/632 A

OTHER PUBLICATIONS
Vogel "Practical Organ. Chemistry" (1957) 3rd ed., pages 122 to 135, QD 251 V6.

Turova et al., "Russian Chemical Reviews," Vol. 35, (1965), pages 161, 162, 165, 167, 168, 171, 172, 174, 175, 177, 178, 179, 180, QD1.R8.

*Primary Examiner*—Bernard Helfin
*Assistant Examiner*—Joseph E. Evans
*Attorney*—Richard Low and Murray Schaffer

[57] ABSTRACT

A method of purifying alkali metal alkoxides which comprises dissolving said alkoxides in a solvatizing solvent capable of forming, together with said alkoxides, crystalline adducts or solvates, such as, for example, of pyridine or tetrahydrofuran, allowing the filtered adduct solution to crystallize preferably at temperatures of below zero degrees centigrade, and decomposing the crystals obtained by heating the same, under reduced partial or absolute pressure, to form a pure alkoxides and vapors of the aformentioned solvatizing solvent, the vapors being then separated off. In the process of crystallizing and washing the crystals there may be added a poor solvent for the adduct, such as, e.g., an aliphatic hydrocarbon, which solvent, however, is fairly miscible with the adduct forming solvent.

7 Claims, No Drawings

METHOD OF PURIFYING ALKALI METAL ALKOXIDES

BACKGROUND OF THE INVENTION

Alkali metal alkoxides have recently been gaining in importance as catalysts in the anionic polymerization of some monomer types. Some of these alkoxides have stereospecific effects. For the aforesaid purpose, however, it is necessary to prepare the alkoxides in high purity grades, which processes are associated with certain problems not as yet solved.

In order to solve the problem arising in methacryl ester polymerization by means of metal alkoxides, it has been necessary to prepare the alkali metal alkoxides in pure state, that means free of even alcohol traces. During the several last years there have appeared in the professional literature a number of comprehensive papers concerning methods of preparing alkoxides as well as properties of the same. By using the aforesaid methods, however, it has not been possible as yet to obtain alkali metal alkoxides of high purity grades. The main obstacle in the way to satisfactory purifying processes consists in the very properties of said alkoxides, since they are predominantly non-volatile and insoluble in conventionally used inert aprotic solvents. Thus, for instance, the alkoxides are liable to coalesce particles of alkali metals, whereby the reaction procedure has the disadvantage that the respective alkoxides formed is contaminated by the starting unreacted substances, i.e., alkali metal and alcohol. An exception arises in connection with the alkoxides having with branched carbon chains, such as, tertiary butoxides capable of sublimation in vacuum lower than 0.5 Torr. Nevertheless, in order to obtain a pure product, multiple sublimation processes are necessary. Additionally, in such sublimation processes the temperatures exceed 150° Centigrades so that there is caused a slight decomposition of alkoxides, the products of which are apt to contaminate the sublimate. By means of thermal analysis it has, now, been found that the decomposition of the alkoxides begins at far lower temperature ranges than heretofor known. Only some lithium alkoxides are soluble in hydrocarbons.

The purpose of the present invention and the basic object of the same is to overcome the aforementioned disadvantages and to significantly improve the method of purifying alkali metal alkoxides.

SUMMARY OF THE INVENTION

In accordance with one feature of our invention we provide a method of purifying alkali metal alkoxides, which comprises dissolving an alkoxides in a solvatizing solvent capable of forming with the alkoxides, crystalline adducts or solvates. The resulting solution is filtered and then allowed to crystallize preferably at temperatures of below 0° Centigrades, after, having been previously concentrated. The crystals obtained are washed thoroughly and heated under a reduced partial or absolute pressure in order to decompose them to the respective pure alkoxides and vapors of the aforesaid solvatizing solvent, the vapors being then separated off. As to said adducts or solvates they may be derived from pyridine or tetrahydrofuran, or from their lower alkyl derivatives respectively.

According to another feature of the present invention, the reaction giving rise to the alkoxides is carried out in the presence of said solvatizing solvents.

According to still another feature of the invention, in the process of crystallizing and washing the crystals, there is added to the mother liquor or to the washing one, respectively, a poor solvent for the adduct, such as, for example, an aliphatic hydrocarbon, which solvent is fairly miscible with the aforesaid adduct forming solvent.

DESCRIPTION OF THE PREFERRED EMBODIMENTS

Thus, the solvates according to the present invention, as, for instance, tetrahydrofuran or pyridine, are stable at lower temperatures so that they can be washed thoroughly by using the same solvent but at elevated temperatures the solvent is liable to be split off, leaving a pure alkali metal capable of meeting all alkoxides of the necessary requirements of purity which are necessary if the alkoxides is to be employed for anionic polymerization. The temperature at which the splitting-off of the solvatizing solvent is complete is relatively low (i.e., up to 100° Centigrades at the most) so that the thermal decomposition and thereby the contamination of the reaction product with the decomposition products does not occur. The absolute pressure reduction can be replaced by reducing the partial solvent pressure in such a way that a stream of a pure inert gas, such as, for example, argon, is led over the crystals. Since the losses encountered in the crystallizing process are very small, it is, possible to repeat the crystallization several times whereby an extraordinary degree of purity as necessary for analytical and other purposes may be attained. For the purpose of polymerization, however, a single-step crystallization of the solvate and decomposition of the crystals suffices, as a rule.

The following examples are given as illustrative only without, however, limiting the invention to the specific details thereof.

EXAMPLE 1

In a stream of pure argon the oxygen content of which does not exceed 15 p.p.m. there was introduced into a mixture of tetrahydrofuran (370 ml/mol of alcohol) and sodium in the form of 0.5 mm dia. wire (1.3 gram-atom per one mol of alcohol) tertiary butyl alcohol and the resulting mixture was maintained at a moderate boil. After 17 hours the almost clear solution was filtered through a sintered disc under argon overpressure, concentrated in vacuo and allowed to crystallize for several hours at a temperature of from 60° to 80° Centigrades below zero. The obtained crystals of alkoxides/tetrahydrofuran adduct were sucked off and washed thoroughly by means of tetrahydrofurane and pentane at the crystallization temperature. The isolated crystals were then dried under a pressure of about 1 Torr at a temperature which was being elevated slowly so as not to cause partial adduct melting. The yield of pure tertiary sodium alkoxides, which depended upon the degree of concentration of the solution and the crystallization temperature, amounted in this case 52.8 per cent. The amount of alkali metal was determined and coincided almost exactly with the theoretically calculated one.

EXAMPLE 2

In the same manner as hereinabove referred to there was prepared secondary sodium butyl alkoxides from 1.5 gram-atoms of sodium and 360 ml of tetrahydrofuran per one mol of butanol and heating of, the mixture for 11 hours. The yield was 23 per cent, alkali metal content 23.90 per cent of sodium (theoretically 23.92 per cent of sodium).

EXAMPLE 3

To 1.2 gram-atom of lithium in the form of wire and 460 ml of tetrahydrofuran there were added one mol of tertiary butyl alcohol under pure argon. After 15 hours the solution was filtered as described in EXAMPLE 1, and cooled to 80° Centigrades below zero. The thoroughly washed solvate crystals were then dried in the manner described in EXAMPLE 1. The yield amounted to 54.8 per cent (in theory), the alkali metal content was 8.73 per cent of lithium (calculated value was 8.67 per cent).

EXAMPLE 4

The process as described in EXAMPLE 1 was repeated using 3.9 gram-atom of lithium and 1,800 ml of tetrahydrofuran per one mol (−) (1R) − of menthyl alcohol. The reaction period took 54 hours and the theoretical yield was 72 per cent. The alkali metal content amounted to 4.28 per cent of lithium (calculated value was 4.28 per cent of Li).

EXAMPLE 5

In the same manner as described in EXAMPLE 1 there were processed under agitation 1.2 gram-atom of molten potassium, 450 ml of tetrahydrofuran and one mol of tertiary butyl alcohol. The reaction took 10 hours, the yield was 70 per cent (theory), alkali metal content 34.88 per cent of potassium (calculated 34.85 per cent of potassium).

EXAMPLE 6

Using the process according to the EXAMPLE 1 there were allowed to react 1.3 gram-atom of sodium and 300 ml of tetrahydrofuran per one mol of isopropyl alcohol. After filtration crystallization and washing the tetrahydrofuran was separated at a final temperature of 90° Centigrades. The yield was 75.3 per cent, alkali metal content 27.87 per cent of sodium (calculated to 28.00 per cent of sodium).

Similar results can be obtained even by using other solvents apt to build crystalline, easily decomposable solvate, such as, for instance, with pyridine, lutidine, picoline or methyl tetrahydrofuran.

While the invention has been described as embodied in a method of purifying alkali metal alkoxides, it is not intended to be limited to the details disclosed since various modifications may be made without departing in any way from the spirit of the present invention.

What is claimed as new and desired to be protected by Letters Patent is set forth in the appended Claims:

1. Method of purifying alkali metal alkoxides comprising the steps of dissolving a crude alkali metal alkoxide having branched carbon chains and containing three to 10 carbon atoms in a solvent selected from the group consisting of tetrahydrofuran and pyridine, forming a solution thereof, filtering off any solid material present in said solution and crystallizing the filtrate, decomposing the crystals formed in said crystallization by heating the same under reduced partial or absolute pressure to form pure alkali metal alkoxide and vapors of said solvent and separating off said vapors.

2. Method according to claim 1 wherein the alkali metal alkoxide is sodium butylate and the solvent is tetrahydrofuran.

3. Method according to claim 1 wherein the alkali metal is lithium butylate and the solvent is tetrahydrofuran.

4. Method according to claim 1 wherein the alkali metal alkoxide is potassium butylate and the solvent is tetrahydrofuran.

5. Method according to claim 1 wherein the alkali metal alkoxide is sodium isopropylate and the solvent is tetrahydrofuran.

6. Method according to claim 1 wherein the filtered solution is concentrated prior to carrying out the crystallization.

7. Method according to claim 1 wherein there is added to the filtered solution prior to the crystallization, pentane.

* * * * *